INVENTOR.
Rasmus Vestre
BY
ATTORNEYS

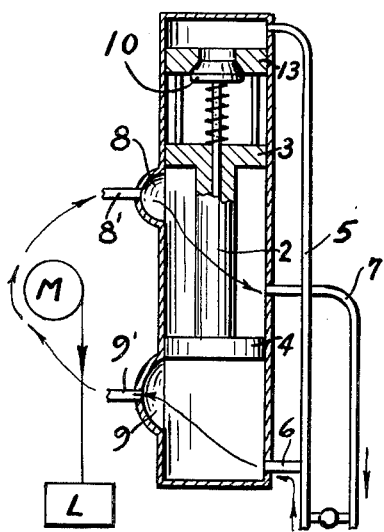
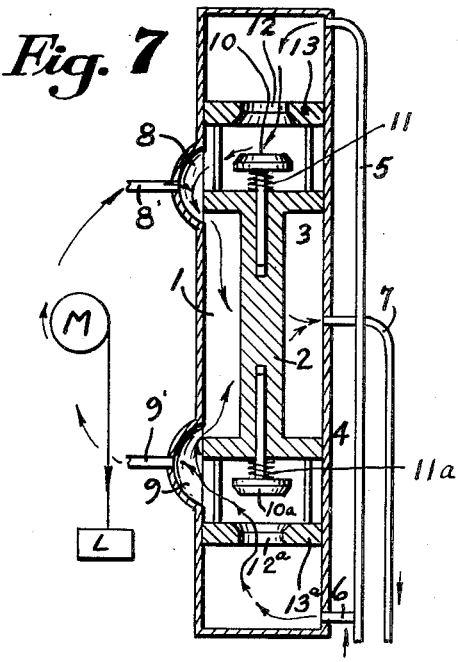
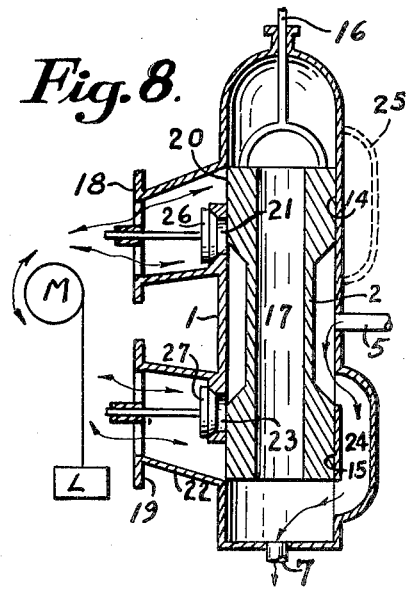
INVENTOR.
Rasmus Vestre
BY Richards Geier
ATTORNEYS Patented Oct. 13, 1953

2,655,000

UNITED STATES PATENT OFFICE 2,655,000

PUMP AND MOTOR HYDRAULIC SYSTEM AND CONTROL VALVE MEANS THEREFOR

Rasmus Vestre, Oslo, Norway, assignor to Hydraulik A/S, Brattvaag, near Aalesund, Norway Application April 25, 1946, Serial No. 664,950
In Norway March 23, 1942

Section 1, Public Law 690, August 8, 1946
Patent expires March 23, 1962

3 Claims. (Cl. 60—53)

This invention relates to a distribution valve used for the purpose of regulating the energy which is delivered to the hydraulic motor and combined with a hydraulic pump which is operated by driving motor and a hydraulic motor which is connected in a fluid circuit in series with the pump.

The invention relates to an arrangement using known types of distribution valves which are combined with circulation, throttling and reversing valves and are provided with a slide which is completely compensated for pressure. With such distribution valves, the slide and the conduits in the valve housing are so formed and arranged that in one position of the slide there is circulation between two connection pipes between the pump and the valve, so that driving medium flows freely from the pressure pipe of the pump through the valve to the return pipe of the pump.

Furthermore, the known distribution valves are so arranged that the slide in at least one position stops the flow between the pressure and return pipes so that the whole driving medium must pass through the hydraulic motor in such manner that it runs at its maximum speed. The speed of the hydraulic motor can be varied by adjusting the slide in intermediate positions whereby a greater or lesser part of the driving medium is throttled through the system, instead of passing through the hydraulic motor. When, for example, the motor drives a winch it may happen that the winch has to keep the load at rest. If no mechanical brake is used, the entire driving medium must be throttled through the system at high pressure corresponding to that which holds the load at rest. When the load is to be lowered, throttling takes place in such manner that the pressure is less than the weight of the load, and the motor will then be retracted by the load. In this manner a correspondingly great throttling and heating of the driving medium will take place if the load is to be suspended and lowered.

On the other hand, it is not advantageous to use a mechanical brake which requires the use of both hands.

An object of the present invention is to provide a device in the course of the use of which this throttling of the circulating driving medium can be avoided when the load is to be suspended at rest.

In accordance with the present invention this object is attained by the provision of one or more stop valves so arranged and fitted that each one independently prevents a flow in the direction from the hydraulic motor to the corresponding pipe if the distribution valve is adjusted for the stoppage of the hydraulic motor by the flow of the driving medium and to check the hydraulic motor against unexpected reversing (or retraction) in case the hydraulic pump in the event of breakdown should stop supplying pressure liquid to the hydraulic motor or the system should become temporarily overloaded.

Various embodiments of the invention are shown on the accompanying drawing wherein:

Figures 2 to 6 are diagrammatic views of this construction of the distribution valve in longitudinal section, the slider being illustrated in different positions.

Figure 7 is a longitudinal section through a distribution valve of still another construction having two check valves upon the slider.

Figure 8 is a longitudinal section through a distribution valve of still another construction having two check valves arranged one in each of the pipes between the distribution valve and the hydraulic motor.

Figure 1:
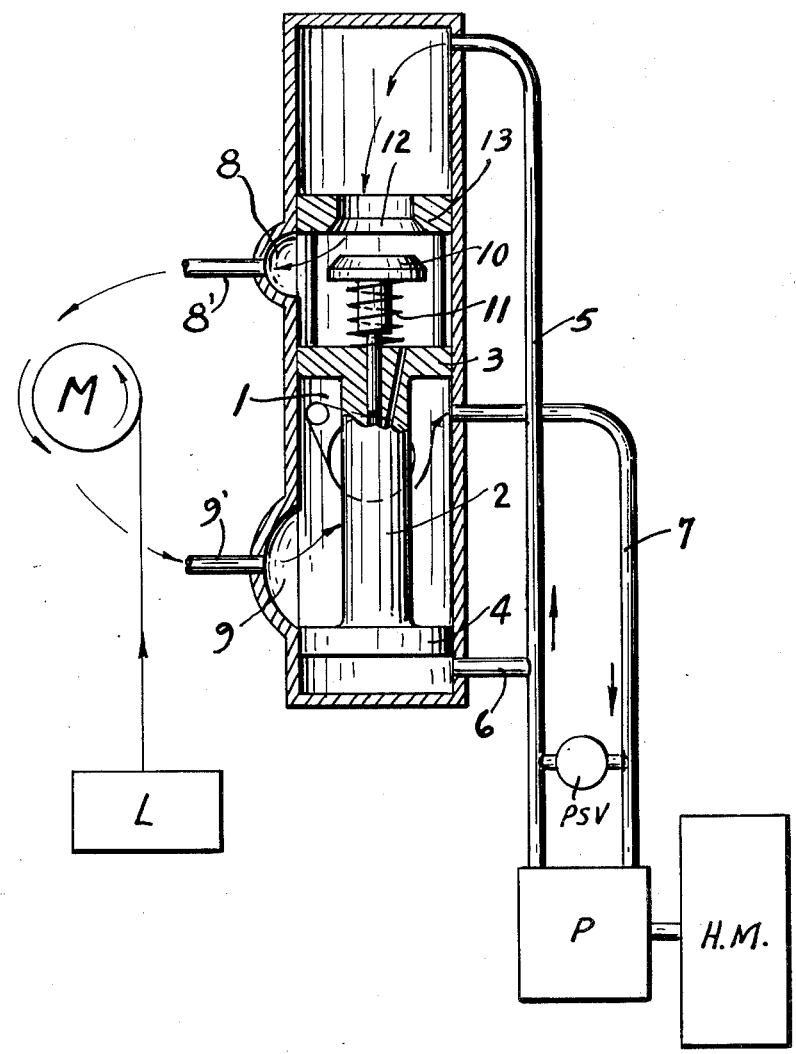
Figure 1 is a diagrammatic view of the distribution valve in longitudinal section having a single check valve arranged upon the slider; this figure also shows the hydraulic pump and its driving motor and further the hydraulic motor with a load, the slider being adjusted to a position for hoisting the load at full speed.

Figure 1 of the drawings shows the hydraulic pump P which is continuously driven in one direction by an engine HM and which delivers a constant quantity of fluid in one direction to the hydraulic motor M. The motor M may drive a winch or any other device not shown upon the drawing; by way of example the load is indicated by L.

Figures 1 to 6 show a valve housing or a cylinder 1. A movable symmetrical slider 2 having lands or sealing pistons 3 and 4 is separated by a portion of reduced diameter. The slider 2 is moved by a handle not shown in the drawing, by means of which all necessary adjustments are effected in the distribution valve.

The upper and lower ends of the cylinder 1 communicate with each other by pipes 5 and 6 to which is connected the pressure pipe of the pump P. Approximately in the center of the cylinder 1 a pipe 7 leads off which is connected to the return or suction pipe of the pump P. A pump safety valve PSV is interposed between the pressure pipe 5 and the suction pipe 7 of the pump P. This safety valve is adjusted for a certain pressure in the pipe 5 corresponding to the maximum weight of load the system is capable of handling. In case of overload the pump safety valve opens and the pressure fluid from the pipe 5 is by-passed through the pump safety valve PSV through the return pipe 7 back to the pump.

The cylinder 1 has spaced by-pass ports 8 and 9 located between the inlets 5 and 6 and connected to the supply pipes 8' and 9', respectively, of the motor M. In a number of such systems there is a hand-operated emergency brake to brake the hydraulic motor M, but such brake is not shown in the drawing.

In accordance with the present invention there are provided in combination with the distribution valve one or more check valves of suitable construction for purposes which will be set forth hereinafter.

In the example shown in Figures 1 to 6 a land 13 is arranged at the top end of the slider 2, the land 13 being axially spaced from the land 3 at the top end of the slider, but being integral therewith. Through the land 13 there is an axial bore formed as a valve seat 12. There is a check valve 10 which is held against the seat by a spring 11. The valve 10 is so arranged that it is opened by pressure in the direction away from the pipe 5 but closes again as soon as this pressure ceases or a greater pressure is exerted from the opposite side.

This embodiment has six main operative positions illustrated in Figures 1 to 6 of the drawings:

(I) When the slider 2 is in its lowermost position as shown in Figure 1, the land 4 blocks the passage between the pipes 6 and 9', and the land 3 blocks the passage between the pipes 7 and 8'. The fluid consequently must flow from the pump P through the pressure pipe 5, through the bore in the land 13, lift the valve 10 from its seat 12 and further through the pipe 8' to the hydraulic motor M and thereafter back to the pump P through the pipes 9' and 7 as shown by arrows. The hydraulic motor M is then driven at its maximum speed in one direction as shown by the arrow for hoisting or lifting the load L. If now for some reason the pump-driving motor HM should stop, the pump P will also stop and will not deliver any pressure fluid through the hydraulic motor M. If same now has hoisted the load from the surface, the weight of such load will tend to drive the motor M as a pump in the reverse direction, thereby causing a back-flow of fluid in the pipe 8' which back-flow will cause the check valve 10 to close against its seat 12 and thereby lock the motor M against further reversing so that the load L will hang freely suspended. If there were no check valve 10 in case the pump P stopped working, the load L would fall down and might thereby cause damage since the operator cannot react sufficiently promptly to brake the motor M with the emergency hand-brake (not shown) which most such systems have.

Figure 2:
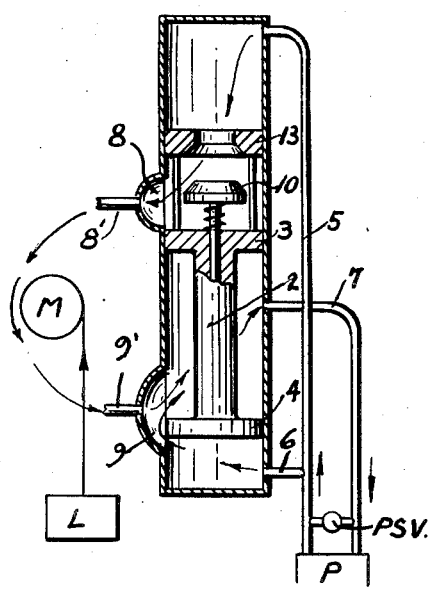

(II) By adjusting the slider 2 axially to a position which is somewhat higher up in the valve housing 1, as shown in Figure 2, the land 3 will still block the passage between the pipes 7 and 8', but the by-pass 9 is opened somewhat for communication with the pipe 6 so that the pressure fluid from the pump P is divided and leads to the cylinder 1 partly through the pipe 5 and partly through the pipe 6. While a certain proportion of the fluid is caused to pass from the pipe 5 through the hydraulic motor M as described in (I) above, the remainder is by-passed from the pipe 6 to the pipe 7, as shown by arrows around the land 4. The speed of the hydraulic motor M may thus be varied by throttling the by-pass 9 with the land 4 between the pipes 6 and 7. Furthermore, in this position of the slider 2 the check valve 10 will close automatically as described in (I) above if, by some reason, pump P should stop supplying pressure fluid and thus a load L will be kept suspended and at rest without doing any damage.

If, in any of the two positions described under (I) and (II) above, the system is being used as a winch and accidentally should tend to handle a load greater than the lifting capacity of such winch, the check valve 10 will close automatically since a greater counter-pressure will be created in the pipe 8' than the fluid pressure from the pipe 5. In the position described under (I) above, the entire pressure fluid will be by-passed back to the pump P through the pump safety valve PSV while in the position described under (II) above, a part of the pressure fluid will be by-passed through such safety valve and another part will be by-passed round the land 4.

Figure 3:
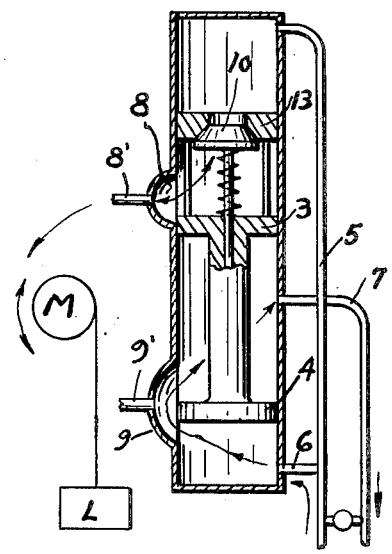

(III) If the load L is to be kept freely suspended while the pump P is continuously supplying pressure fluid, the slider 2 is adjusted axially into a position still further up into the housing 1, as indicated in Figure 3. The fluid from the pipe 6 is thus by-passed round the land 4 to the return pipe 7 as shown by arrows, without the strict throttling described in (II) above. In this position the land 3 still blocks the passage between the pipes 7 and 8', and the check valve 10 will close against its seat 12 and block the passage between the pipes 5 and 8' since there will be created a greater counter-pressure in the pipe 8' against the underside of check valve 10 than the pressure from the pipe 5 against the top of the check valve 10. The fluid in the pipe 8' is under pressure since the weight of the suspended load L tends to turn the hydraulic motor M, and this pressure forces the valve 10 to close upon its seat 12, the land 13 thereby blocking the passage between the pipes 5 and 8' and locking the hydraulic motor against rotation.

Figure 4:
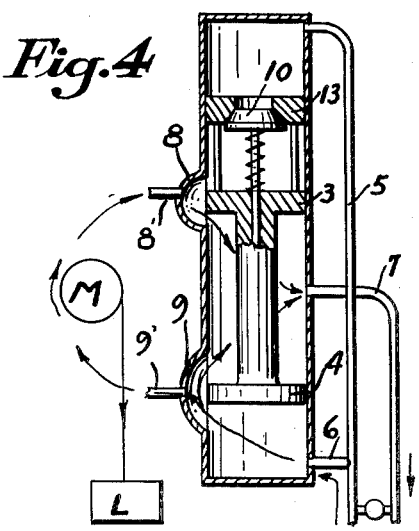

(IV) Controlled lowering of the suspended load is accomplished by moving the slider 2 axially to a position still further up into the housing 1 until the land 3 opens the communication between the pipes 8' and 7 through the cylinder 1, as shown in Figure 4. The weight of the load L will now drive the hydraulic motor M as a pump in the opposite direction from that indicated under (I) and (II) above, and the fluid will be circulated through the pipes 9' and 8', the fluid pressure closing the check valve 10 as described in (III). The lowering speed of the load L is controlled by slightly moving the slider 2 axially until a suitable throttling of the by-pass 8 by the land 3 is obtained. In this position of the slider that portion of the fluid from the pump P which does not pass through the motor M via the pipes 9' and 8', circulates from the pressure pipe 5 via the by-pass 9 around the land 4 to the return pipe 7 and back to the pump P, as shown by arrows.

In the two positions of the slider described under (I) and (II) above, the check valve 10 will be actuated and will close automatically, thereby checking the load against unwanted lowering if and when needed. In the two positions described under (III) and (IV) above, the adjustment of the slider causes the check valve 10 to close in these positions of the slider. In the latter position it is understood that it is the weight of the load L which acts with its gravity upon the motor M and turns it in the direction of the arrows.

Which of the two positions (IV) and (V) is to be preferred depends on the weight of the load. In the case of really heavy loads position (IV) is preferable, while position (V) is to be preferred in the case of lighter loads or no load at all.

Figure 5:
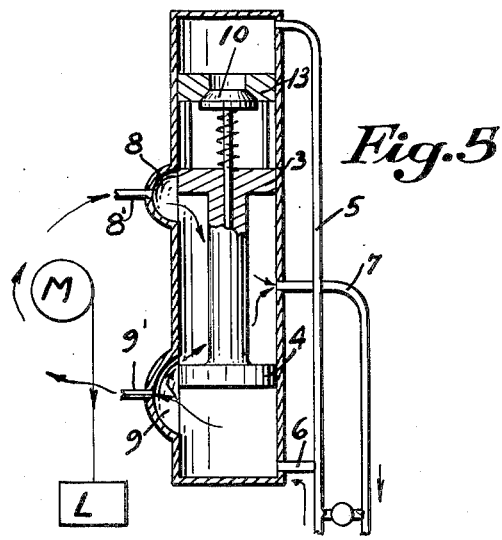

(V) To reverse the direction of rotation of the hydraulic motor M, the slider 2 is moved axially to a position still further up into the valve housing 1, as shown in Figure 5, until the land 3 blocks the passage between the pipes 8' and 5, and there is a strict throttling of the fluid from the pipe 6 around the land 4 to the pipe 7. The greater part of the liquid then flows from the pump P through the pipes 6 and 9' to the hydraulic motor M and back to the pump through the pipes 8' and 7, as shown by the arrows. Controlled reversing speed is obtained by throttling more or less the by-pass 9 between the pipes 6 and 7 round the land 4. In this position of the slider the check valve 10 is inactive.

(VI) To reverse the full speed of the hydraulic motor M, the slider 2 is moved axially still further up into the valve housing 1 until the land 4 blocks the passage between the pipes 6 and 7 and the entire pressure fluid from the pump P flows through the pipe 9', the motor M, the pipe 8', the cylinder 1 and back through the pipe 7 to the pump. In this position of the slider the check valve 10 is inactive.

The two positions described under (V) and (VI) above are true reversing positions because it is the pressure fluid which in its entirety acts upon the hydraulic motor M and turns it in the direction of the arrows.

In Figure 7 the reference numerals 1 to 13 correspond with the reference numerals 1 to 13 in Figure 1 to 6. The check valve, the spring, the valve seat and the land at the lower end of the slider have been designated by reference numerals 10a, 11a, 12a and 13a, respectively. As shown in Figures 1 to 6, the entrances of the pipes 6 and 9' are slightly irregular with respect to the entrances of the pipes 7, 5, and 8' into the housing 1. The reason for this is that said check valve 10 acts only in one direction of fluid flow. It will be noted that the lower end of cylinder 1 in the construction shown in Figure 7 is longer than in the construction shown in Figure 1 to provide sufficient space for the land 13a, the inlet port 6 being spaced the same distance from the by-pass port 9 as the inlet port 5 is spaced from the by-pass port 8. To enable the system to work in both directions the slider 2 with its lands 13, 3, 4, and 13a, the two check valves 10 and 10a, the pipes 8' and 9', as well as the pipes 5 and 6, respectively, are arranged symmetrically with respect to each other and the inlet of the pipe 7 to the housing, as shown in Fig. 7. In this figure the slider 2 occupies its midway position in relation to the part of the housing cylinder between the lands 3 and 4, with both motor pipes 8' and 9' open. The pressure fluid will now be evenly divided through the pressure pipes 5 and 6 to simultaneously open both check valves 10 and 10a, partly by-pass the lands 3 and 4, and then return to the pump P via the pipe 7.

If there is no load upon the hydraulic motor M it will be kept at rest without turning, but if the motor M has a load L freely suspended, the load will tend to drive the motor as a pump, and a part of the pressure liquid will pass through the pipes 9', the motor M, the pipe 8', and back to the pump via the pipe 7. By moving the slider axially upwards from the position shown in Figure 7, the upper check valve will close, and by moving the slider downwards from the position illustrated, the lower check valve 10a will close. Regulating may be carried out by adjusting the slider into intermediate positions, as described in the foregoing positions (I) to (VI). Thus the distribution valve will be a double-acting valve but it will be possible to bring only one check valve into action each time, one check valve for one determined direction of the motor M, and the opposite check valve for the reverse direction of the motor M.

Under certain conditions, for example, when the distribution valve is used in hydraulic steering systems onboard ships, it may be of importance to lock the hydraulic motor M against turning in either direction, even when such motor stands under a load. Such embodiment is shown in Figure 8 of the drawings where the corresponding parts are indicated by the same reference numerals as in the preceding Figures. The distribution valve slide 2 has symmetrical lands 14 and 15 with a portion of reduced diameter therebetween, and which is moved by a member 16. The two ends of the cylinder 1 communicate with each other by a central longitudinal conduit 17 in the slide. The pressure pipe 5 of the pump is connected onto the center of the cylinder 1 and the return pipe 7 is connected at the lower end of the housing. 18 and 19 indicate connecting pipes leading to the hydraulic motor. These pipes are each connected with the housing 1 by two conduits 20, 21 and 22, 23. In each of the conduits 21 and 23 non-return valves 26 and 27 are arranged which open only for the flow of the driving medium in a direction to the hydraulic motor.

This device operates in the following manner:

In the position in which the slide is shown, the driving medium flows freely from the pressure pipe 6 through the by-pass 24, and if an extra bypass 25 is arranged also through this by-pass, and the central conduit 17 of the slide back to the return pipe 7. On the other hand, the pipes to the hydraulic motor are blocked and the non-return valves operate in such manner that the hydraulic motor is blocked in both directions of rotation. When the hydraulic motor is used as a winch motor, the motor can hold the load at rest when the slide is adjusted to the position shown in Figure 8 of the drawing.

In the extreme positions of the slide, the by-pass flow is completely blocked and the entire driving medium must then pass through the hydraulic motor which is thereby driven at its maximum speed in one or the other direction. In this example also, the speed of the hydraulic motor is varied by bringing the slide into intermediate positions.

With the use of a device of the kind here described, mechanical brakes are unnecessary; the pump can deliver the driving medium without pressure throttling, the heating of the driving medium caused thereby can be considerably reduced and everything can be controlled by the use of a single handle.

What I claim is:

1. In a hydraulic transmission having a motor and a constantly running pump actuating the motor by a hydraulic fluid; a valve for controlling the flow of the hydraulic fluid from the pump to the motor, the valve comprising a housing member, the housing member having a longitudinal bore formed therein, the bore being closed at both ends, the housing member further having two inlets from the pressure side of the pump and opening into the bore and a return opening between said inlets for the connection of the bore to the suction side of the pump, the housing member further having two additional openings in spaced relationship for the connection of the bore of the housing member to the motor, each of said additional openings being located between said return opening and a different one of said inlets, a slide member displaceable longitudinally in the bore, a check valve carried by said slide member and positioned in the bore between one of said inlets and one of said additional openings and opening in the direction of the flow of the hydraulic fluid to connect said one inlet with said one additional opening when the slide is set for operating the motor.

2. In a hydraulic transmission having a motor and a constantly running pump actuating the motor by a hydraulic fluid; a valve controlling the flow of the hydraulic fluid from the pump to the motor, the valve comprising a housing with closed ends, the housing having a longitudinal bore intermediate the closed ends having an inlet adjacent each closed end and a return opening intermediate the inlets; the bore further having two additional openings, each additional opening being intermediate one of the inlets and the return opening, the inlets and openings communicating with the bore; a pipe line connecting each inlet with the pressure side of the pump, a second pipe line connecting the return opening with the suction side of the pump, and an additional pipe line connecting each of the two additional spaced openings with opposite sides of the motor; a slide displaceable longitudinally in said bore and having an integrally formed land at each end and an integrally formed third land intermediate the end lands, said lands closely fitting against the wall of the bore and coacting with the inlets and openings, said additional openings being substantially wider than each of said lands, said slide further having an axial bore formed through at least one end, the axial bore extending to a point intermediate said one end and said third land and forming a continuous passageway between the contiguous end of the longitudinal bore of the housing and the space formed by the slide and the housing intermediate said one end land and said third land of the slide, and at least one check valve in the slide disposed in the axial bore and operable to permit the flow of hydraulic fluid only in the direction of the motor.

3. In a hydraulic transmission having a motor and a pump, a valve controlling the flow of hydraulic fluid from the pump to the motor and comprising an elongated housing and a slide movable in said housing, pipes connecting the pressure side of the pump with the two ends of said housing and connecting the suction side of the pump with substantially the middle of said housing, two pipes connecting said motor with said housing on opposite sides of said housing middle, said slide being positionable to establish communication between one of the motor pipes and the suction pipe while interrupting communication between the other motor pipe and the suction pipe, said slide having supply lines located at opposite ends thereof and leading from the pressure pipes to the motor pipes, and check valves located in said supply lines and operable to permit the flow of fluid only in the direction of the motor.

RASMUS VESTRE.

References Cited in the file of this patent

UNITED STATES PATENTS

| Number | Name | Date |
|---|---|---|
| 695,061 | Lang | Mar. 11, 1902 |
| 1,775,856 | Hauser | Sept. 16, 1930 |
| 1,955,154 | Temple | Apr. 17, 1934 |
| 2,359,802 | Stephens | Oct. 10, 1944 |
| 2,387,307 | Stone | Oct. 23, 1945 |
| 2,482,249 | Court | Sept. 20, 1949 |